Patented Aug. 17, 1954

2,686,809

UNITED STATES PATENT OFFICE 2,686,809

STABILIZED AROMATIC AMINES

Adrian L. Linch, Wilmington, Del., assignor to E. I. du Pont de Nemours & Company, Wilmington, Del., a corporation of Delaware No Drawing. Application January 23, 1952, Serial No. 267,931

20 Claims. (Cl. 260—578)

This invention relates to aromatic amines which have been stabilized against atmospheric oxidation, particularly by having incorporated therein small proportions of a new class of antioxidants therefor.

It has long been recognized that aromatic amines tend to become rapidly oxidized through contact with air which results in loss of the aromatic amines and decrease in their quality through contamination by the oxidation products. When aromatic amines have acquired a dark color from exposure to air, they are not suitable for the manufacture of azo dyes, pigments, basic colors, vat dyes, pharmaceuticals, rubber chemicals, etc. For example, xylidine will oxidize in 2 to 3 weeks under normal storage conditions to a point which renders it unsuitable for use in azo colors, and para-toluidine oxidizes to a deep red color in 2 to 3 days when stored in the liquid state at 60° C. to 80° C. In practice, such oxidation has been largely avoided by consuming the amines within a few days of their production or the amines have been purified, by distillation or crystallization, just prior to their use. In some cases, the loss of unstabilized amine has been as high as 1% per week and the accumulated oxidation products have adversely affected the yield of substances prepared therefrom, such as azo dyes, by as much as 10%.

In industroal' practice, the close scheduling of the production of the amines with the processes in which the amines are consumed has become increasingly less practical. The storage of amines, which deteriorate so that they require purification before use, is prohibitively costly because of the loss of amine by oxidation and the further losses incurred in the purification processes.

Attempts to stabilize aromatic amines, by the use of conventional anti-oxidants employed for stabilizing other substances, have not been commercially successful because such anti-oxidants are inefficient or inoperative. In many cases, such conventional anti-oxidants produce negative results in the aromatic amines; that is, they act as pro-oxygenic catalysts. Also, most metal deactivating agents actually increase the susceptibility of the aromatic amines to attack by atmospheric oxygen.

A. E. Robertson, in Patent No. 2,434,651, proposes to stabilize aromatic amines by adding carbon bisulfide thereto, which carbon bisulfide tends to liberate hydrogen sulfide. While carbon bisulfide and hydrogen sulfide are quite effective anti-oxidants for aromatic amines, they are gases which readily escape from the amines, are obnoxious and toxic and present explosion and corrosion hazards which greatly reduce their utility.

It has also been proposed to stabilize certain aromatic amines with aromatic mercaptans. However, such aromatic mercaptans are not particularly effective and, after a short period, invert to pro-oxygenic catalysts. Also, some of such aromatic mercaptans are inoperative with some amines and actually increase the susceptibility of such amines to atmospheric oxidation.

It is an object of my invention to provide a class of aromatic amines containing a new class of compounds which are effective to inhibit oxidation of the amines and which do not invert to pro-oxygenic catalysts. Another object is to provide a class of aromatic amines which are effectively stabilized against atmospheric oxidation, whereby loss of amine by oxidation is prevented, contamination of the amine by oxidation products is reduced and the deleterious effects of the oxidation products in the amine are avoided. A further object is to provide a novel and improved method for stabilizing a specific class of aromatic amines. Further objects are to provide new compositions of matter and to advance the art. Still other objects will appear hereinafter.

The above and other objects may be accomplished in accordance with my invention which comprises incorporating in a certain class of aromatic amines from about 0.01% to about 0.5% by weight of a certain class of dithiocarbamates. The aromatic amines are of the class of alpha-naphthylamine, N - phenyl - alpha - naphthylamine, tolidines, N-monoalkyl-4-aminophenols in which the alkyl group contains 1 to 4 carbon atoms, and aromatic amines of the formula R—NH$_2$ within R is a mono-substituted phenyl radical in which the substituent group is in one of the positions ortho and para to the NH$_2$ group and is selected from alkyl groups of 1 to 4 carbon atoms, alkoxy groups of 1 to 4 carbon atoms, and a monophenylamino group, or a meta-NH$_2$ substituted phenyl radical, and such substituted phenyl radicals which also contain one additional substituent selected from alkyl groups of 1 to 4 carbon atoms and a chlorine atom. The dithiocarbamates are of the class of sodium, potassium and zinc salts of N-substituted dithiocarbamic acids containing 1 to 2

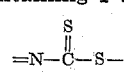

groups and in which the substituent groups are selected from hydrocarbon radicals of 1 to 8 carbon atoms, monohydroxy-substituted acyclic hydrocarbon radicals of 1 to 8 carbon atoms, the —CH$_2$CH$_2$—O—CH$_2$CH$_2$—group, and divalent hydrocarbon radicals of 13 to 16 carbon atoms containing two 6-membered carbocyclic rings joined by a saturated acyclic group and in which the free valences belong to different rings, in which dithiocarbamate there is only one bond directly connecting any nitrogen atom to any carbon atom and only 1 to 2 bonds directly connecting any carbon atom to another carbon atom.

I have found that such dithiocarbamates are efficient anti-oxidants for such aromatic amines. They effectively inhibit oxidation of such aromatic amines and prevent loss of the amine by oxidation, reduce contamination of the amine by oxidation products and avoid the synergistic action of the oxidation products in subsequent chemical processes in which the amines are employed. The resulting stabilized aromatic amines may be stored for relatively long periods of time, thereby obviating the necessity for close scheduling of the amine production with the process in which the amine is consumed and usually making costly purification processes unnecessary. Such dithiocarbamates are also effective to protect the amines in the processes by which they are manufactured so that higher yields of amine of better quality can be obtained. Such dithiocarbamates are known to the art and can be made readily at reasonable cost by methods which are well-known to the art.

Through extensive research with many aromatic amines and many anti-oxidants, I have found that few, if any, anti-oxidants are effective with all aromatic amines, the susceptibility of any aromatic amine to stabilization by any specific anti-oxidant depending upon the presence or absence of substituent groups upon the aromatic nucleus, upon the character of the substituent groups and, frequently, upon the character of the aromatic nucleus and the position of a substituent group thereon. For example, many of the dithiocarbamates of my invention actually accelerate the oxidation of aniline and meta-toluidine, of which the following are representative:

Sodium dimethyl dithiocarbamate
Sodium diethyl dithiocarbamate
Zinc di-n-propyl dithiocarbamate
Sodium di-n-propyl dithiocarbamate
Potassium dibutyl dithiocarbamate
Zinc diallyl dithiocarbamate
Sodium dicyclohexyl dithiocarbamate
Sodium N-phenyl N-ethyl dithiocarbamate Also, replacement of the specified metals in the dithiocarbamates of my invention with other metals, such as tin, calcium, manganese and zirconium, and amines, frequently results in compounds which are ineffective as anti-oxidants for some of the aromatic amines. On the other hand, the dithiocarbamates of my invention are believed to be operative with all of the aromatic amines of my invention, and none of such dithiocarbamates have been found to be inoperative with any of such aromatic amines.

The aromatic amines, which may be effectively stabilized by the dithiocarbamates of my invention, are:

I. Alpha-naphthylamine;
II. N-phenyl-alpha-naphthylamine;
III. Meta-phenylene diamine;
IV. The tolidines, which are diphenyls in which each benzene ring contains both an NH$_2$ group and a methyl group;
V. N-monoalkyl-4-aminophenols in which the alkyl group contains 1 to 4 carbon atoms, represented by N-isobutyl-4-aminophenol;
VI. Aromatic amines of the formula R—NH$_2$ in which R is a monosubstituted phenyl radical in which the substituent is an alkyl group of 1 to 4 carbon atoms in one of the positions ortho and para to the NH$_2$ group, represented by ortho-toluidine and para-toluidine;
VII. Aromatic amines of the formula R—NH$_2$ in which R is a disubstituted phenyl radical in which the substituents are alkyl groups of 1 to 4 carbon atoms one of which is in one of the positions ortho and para to the NH$_2$ group and the other may be in any position on the benzene ring, represented by the xylidines;
VIII. Aromatic amines of the formula R—NH$_2$ wherein R is a monosubstituted phenyl radical in which the substituent is an alkoxy group of 1 to 4 carbon atoms in one of the positions ortho and para to the NH$_2$ group, represented by ortho-anisidine, para-anisidine, ortho-phenetidine and para-phenetidine;
IX. Aromatic amines of the formula R—NH$_2$ wherein R is a disubstituted phenyl radical in which one substituent is an alkoxy group of 1 to 4 carbon atoms in one of the positions ortho and para to the NH$_2$ group and the other substituent is an alkyl group of 1 to 4 carbon atoms or a chlorine atom in any position on the benzene ring, represented by the methyl ethers of amino cresols, such as cresidine;
X. Aromatic amines of the formula R—NH$_2$ wherein R is a disubstituted phenyl radical in which one substituent is an alkyl group of 1 to 4 carbon atoms in one of the positions ortho and para to the NH$_2$ group and the other substituent is a chlorine atom in any position on the benzene ring, represented by 2-chloro-4-amino toluene and 4-chloro-2-amino toluene;
XI. Aromatic amines of the formula R—NH$_2$ wherein R is a disubstituted phenyl radical in which one substituent is an NH$_2$ group in the position meta to the NH$_2$ group of the formula and the other substituent is an alkyl group of 1 to 4 carbon atoms or a chlorine atom in any position on the benzene ring, represented by toluylene diamine;
XII. Aromatic amines of the formula R—NH$_2$ wherein R is a monosubstituted phenyl radical in which the substituent is a monophenylamino group in one of the positions ortho and para to the NH$_2$ group, represented by 4-amino-diphenyl amine, and such amines containing in addition an alkyl group of 1 to 4 carbon atoms or a chlorine atom in any position on the benzene ring.

From a consideration of the amines of VI to XII above and the examples given hereinafter, it is apparent that the addition of an alkyl group of 1 to 4 carbon atoms or of a chlorine atom to the benzene ring of the aromatic amines, which contain a single substituent in the ortho or para position, does not affect the susceptibility of the amines to stabilization by the dithiocarbamates of my invention.

The dithiocarbamates of my invention are restricted to the sodium, potassium and zinc salts of N-substituted dithiocarbamic acids. It will be understood that, in the case of the zinc salts, the zinc satisfies two dithiocarbamic acid groups.

Such dithiocarbamates include those of the formula:

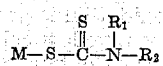

wherein M represents sodium, potassium or zinc; $R_1$ represents a hydrocarbon radical of 1 to 8 carbon atoms or a monohydroxy-substituted acyclic hydrocarbon radical of 1 to 8 carbon atoms; and $R_2$ represents hydrogen, a hydrocarbon radical of 1 to 8 carbon atoms, or a monohydroxy-substituted acyclic hydrocarbon radical of 1 to 8 carbon atoms. The hydrocarbon radicals include saturated acyclic, olefinic, cycloaliphatic, aryl, alkaryl and aralkyl radicals.

The dithiocarbamates of my invention also include the compounds of the formula:

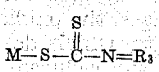

wherein M represents sodium, potassium or zinc and $R_3$ represents a divalent hydrocarbon radical in which the free valences belong to different carbon atoms, or the —CH₂CH₂—O—CH₂CH₂— group. In such compounds, the radical $R_3$ forms with the nitrogen a heterocyclic ring.

The dithiocarbamates of my invention also include compounds of the formula:

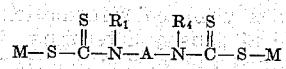

wherein each M represents sodium or potassium or the two M's represent zinc; A represents a divalent hydrocarbon radical of 1 to 8 carbon atoms or a divalent hydrocarbon radical of 13 to 16 carbon atoms which contains two 6-membered carbocyclic rings joined by a saturated acyclic group and in which the free valences belong to different rings; and $R_1$ and $R_4$ represent hydrogen, separate monovalent hydrocarbon radicals of 1 to 8 carbon atoms, monovalent monohydroxy-substituted acyclic hydrocarbon radicals of 1 to 8 carbon atoms, or $R_1$ and $R_4$ together form a second divalent radical similar to A.

Merely to illustrate the variations in the formulas of the dithiocarbamates of my invention, representative dithiocarbamates are listed below with their structural formulas.

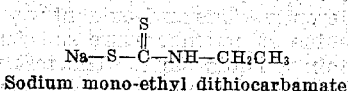
Sodium mono-ethyl dithiocarbamate

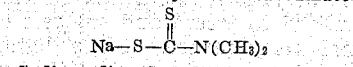
Sodium dimethyl dithiocarbamate

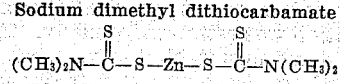
Zinc dimethyl dithiocarbamate

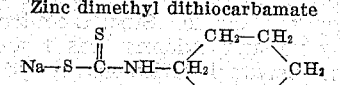
Sodium cyclohexyl dithiocarbamate

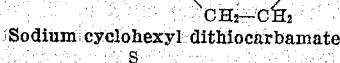
Sodium bis-2-hydroxyethyl dithiocarbamate

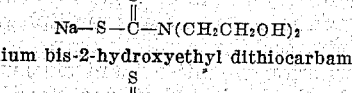
Sodium dibenzyl dithiocarbamate

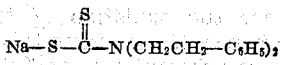
Sodium di(beta-phenylethyl) dithiocarbamate

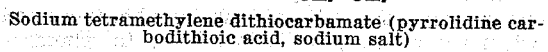
Sodium tetramethylene dithiocarbamate (pyrrolidine carbodithioic acid, sodium salt)

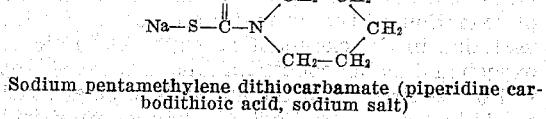
Sodium pentamethylene dithiocarbamate (piperidine carbodithioic acid, sodium salt)

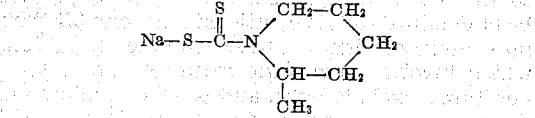
Sodium alpha-methyl pentamethylene dithiocarbamate (alpha-pipecoline carbodithioic acid, sodium salt)

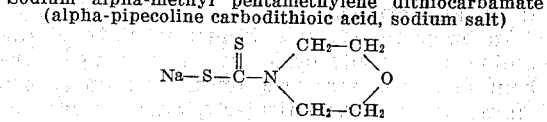
4-morpholine carbodithioic acid, sodium salt

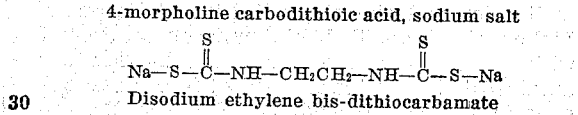
Disodium ethylene bis-dithiocarbamate

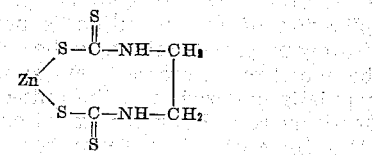
Zinc ethylene bis-dithiocarbamate

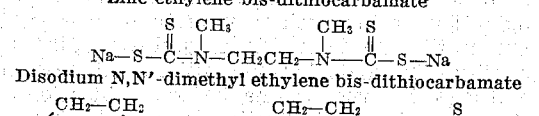
Disodium N,N'-dimethyl ethylene bis-dithiocarbamate

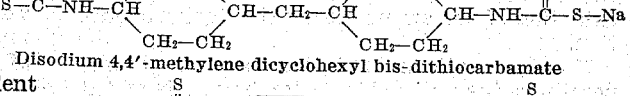
Disodium 4,4'-methylene dicyclohexyl bis-dithiocarbamate

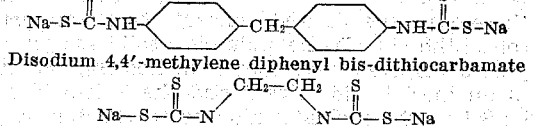
Disodium 4,4'-methylene diphenyl bis-dithiocarbamate

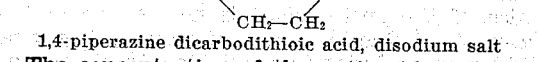
1,4-piperazine dicarbodithioic acid, disodium salt

The concentration of the anti-oxidant in the amine should be from about 0.01% to about 0.5% by weight, preferably, from about 0.05% to about 0.3%, and usually about 0.1%. While the anti-oxidants of my invention may be effective in concentrations above 0.5%, such higher concentrations will generally be objectionable as they would contaminate the amine to an undesirable extent. Also, concentrations below 0.01% of anti-oxidant will usually show some effect, but such effect will generally be insufficient for practical purposes.

Not all of the dithiocarbamates (anti-oxidants) of my invention are equally effective for all of the aromatic amines of my invention. Accordingly, the particular anti-oxidant and the concentration employed for each of the aromatic amines will be chosen in accord with the degree of stability desired. Also, the choice of anti-oxidant and the concentration thereof will be governed by the conditions to which the aromatic amine will be exposed, such as light, temperature and atmospheric contact. Light acts as a catalyst for the oxidation of the aromatic amines and hence, if the amine is to be exposed to light for any substantial period of time, it will be necessary to materially increase the concentration of the anti-oxidant. Furthermore, the rate of oxidation of the aromatic amine increases with increase in temperature, so that the concentration of the anti-oxidant should be increased when the amine is to be subjected to temperatures above atmospheric. Furthermore, the rate of oxidation of the aromatic amine varies with variation in the extent of its exposure to air or oxygen and higher concentrations of anti-oxidant will be required when the amine is to be exposed to air to any material extent. Therefore, it will be understood that the anti-oxidants exhibit their maximum efficiency under storage conditions which involve room temperature or lower temperatures, exclude light, and provide a minimum contact with air or oxygen, as in closed metal tanks and drums.

In order to obtain optimum stability of the amine, I generally prefer to add the dithiocarbamate to the aromatic amine as soon as the amine is prepared, particularly, immediately after distillation or during crystallization of the amine. If the amine is distilled, minimum contact thereof with oxygen and maximum stabilization are obtained if the amine is distilled into a receiver containing the anti-oxidant. However, the application of my invention is not restricted to freshly prepared amines, as the anti-oxidant may be added to an aromatic amine which has been partially oxidized, and the anti-oxidant will effectively retard further oxidation of the amine. Also, the anti-oxidants may be added during the manufacture of the amine to avoid atmospheric oxidation during such manufacture, to thereby obtain the amine in higher yields and better quality. In particular, the anti-oxidant may be added to the crude amine, before purification of the amine by crystallization, to thereby inhibit oxidation of the amine during the drying operation.

If the aromatic amine is liquid at normal temperatures, the anti-oxidant may be simply added thereto in the desired concentration and dissolved therein. If the amine is a solid at atmospheric temperatures, it may be melted or dissolved in an inert liquid solvent and the anti-oxidant added to the melted amine or to the solution. Also, if the anti-oxidant is not soluble in the aromatic amine to the extent desired, it may be added as a solution in a suitable solvent, such as ethanol, isopropyl alcohol and ether. The anti-oxidants effectively stabilize the aromatic amines in the presence of inert solvents and diluents.

Examples are given hereinafter, illustrating the effect of representative dithiocarbamates of my invention in stabilizing representative aromatic amines, some of such examples including tests with other dithiocarbamates for purposes of comparison. The tests with liquid aromatic amines were carried out in clear glass bottles filled to approximately 75% of their capacity with the amine or stabilized amine and exposed to diffused daylight at room temperature. The bottles were capped but not sealed air-tight. In the absence of practical specific analytical methods for direct determination of the concentration of oxidation products in the preliminary stages, the rate of formation of visible color was adopted as the basis for the determination of anti-oxidant activity. The development of color follows an orderly sequence which is related to the extent of oxidation. In nearly every case, the first visible indication of oxidation is produced by derivatives which impart a yellow color to the system, followed by further oxidation to red compounds.

Final stages of oxidative decomposition were evidenced by the appearance of green and blue components. Although the oxidation follows a complex series of reactions, and the constitutions of many of the intermediate products are unknown, the autocatalytic nature of the system can be easily demonstrated.

Evaluation of anti-oxidants, which are effective inhibitors for atmospheric oxidation of the aromatic amines, has disclosed a certain amount of specificity in the chain of reactions. Whereas, certain inhibitors suppress the initial oxidation to yellow derivatives, the oxidation rate of these yellow components, which do form, to the red stage is only slightly reduced. Other inhibitors are only partially effective in suppressing the production of the initial yellow derivatives, but effectively prevent oxidation to red products. Similar results have been observed in the red to blue-green development stages. Therefore, in order to establish a common basis for quantitative evaluation of anti-oxidant efficiency, the rate of formation of each of these three color classes, as well as total visible color formation, was evaluated as optical density determined in a Cenco-Sheard-Sanford Photelometer, using blue (central maximum=410 millimicrons), green (525 millimicrons) and red (610 millimicrons) filters and no filter. Distilled water was used as the reference standard, and the density expressed as per cent transmission. Experience has shown that the use of aromatic amines, darker than a red-amber color, do not produce satisfactory results in chemical processes. Therefore, when oxidation has progressed to an extent sufficient to reduce the total light transmission below 75%, blue transmission below 20%, green below 60% and red below 95%, the amine is considered to be unsuitable for use without purification. The sum of the number of days required to reach each of these four values is designated as the index. The anti-oxidant index is obtained by subtracting the index of the unstabilized control sample from the index of the stabilized material. This method minimizes the small variations in oxidation susceptibility exhibited by individual production lots of most amines.

Evaluation of those amines, which are normally solid at room temperature, was carried out somewhat differently. The anti-oxidant was dissolved in the amine at a temperature sufficiently high to maintain a liquid state. The test was then conducted at that temperature, or the solution was permitted to freeze and the test continued at normal temperature. Since light density measurements were not practical, the progress of the oxidation was estimated visually. The amine was considered unsuitable for use when the color change had progressed to a dark red, dark brown, or dark lavender shade. Since a control sample, containing no anti-oxidant, was tested at the same time, personal variations in judgment of color depth largely cancelled out. In order to place these evaluations on the same index basis adopted for liquid amines, the number of days elapsed to the end point was multiplied by four. In several cases, the crystallizing point was used as the criterion of anti-oxidant efficiency.

In order to further show the effectiveness of the anti-oxidants of my invention, the ratio of the stability of the stabilized amine to the stability of the unstabilized amine may be calculated by dividing the index of the stabilized amine by the index of the unstabilized amine (control index). This ratio is the "Stability Ratio." This stability ratio expresses the relation of the storage life of the stabilized amine to the storage life of the unstabilized amine under the same conditions. For example, a stability ratio of 2 indicates that the stabilized amine requires twice as long as the unstabilized amine to reach the final stage of oxidative decomposition where it is considered to be unsuitable for most uses; that is, the stabilized amine has a storage life 2 times that of the unstabilized amine.

EXAMPLE 1

Ortho-toluidine

The amine to be stabilized was a commercial grade of ortho-toluidine in which a 100 cc. sample distilled from 5 cc. to 95 cc. over a range of 1.0° C. including 200.2° C., contained not less than 99.0% total toluidine by diazotization, and was completely soluble in 10% hydrochloric acid. The ortho-toluidine was redistilled at 20 mm. pressure to separate it from colored non-volatile impurities and to obtain a colorless product. The tests were conducted at atmospheric temperatures. Control Index of the unstabilized ortho-toluidine was 210. The concentration of the anti-oxidants was 0.1%.

| Anti-oxidant | Anti-oxidant Index |
|---|---|
| 1. Sodium dimethyl dithiocarbamate, dihydrate | 140 |
| 2. Zinc dimethyl dithiocarbamate | 270 |
| 3. Zinc diethyl dithiocarbamate | 240 |
| 4. Sodium di-n-propyl dithiocarbamate, trihydrate | 130 |
| 5. Zinc di-n-propyl dithiocarbamate | 160 |
| 6. Sodium diisopropyl dithiocarbamate, 2½·H₂O | 260 |
| 7. Zinc diisopropyl dithiocarbamate | 240 |
| 8. Sodium dibutyl dithiocarbamate, hydrate | 30 |
| 9. Potassium di-n-butyl dithiocarbamate | 260 |
| 10. Zinc, di-n-butyl dithiocarbamate | 150 |
| 11. Sodium di-n-amyl dithiocarbamate | 10 |
| 12. Sodium diallyl dithiocarbamate | 70 |
| 13. Sodium N-cyclohexyl N-ethyl dithiocarbamate, dihydrate | 90 |
| 14. Sodium dicyclohexyl dithiocarbamate | 270 |
| 15. Sodium bis-2-hydroxyethyl dithiocarbamate | 140 |
| 16. Zinc bis-2-hydroxyethyl dithiocarbamate | 90 |
| 17. Sodium dibenzyl dithiocarbamate | 120 |
| 18. Sodium N-phenyl N-methyl dithiocarbamate, dihydrate | 120 |
| 19. Sodium N-phenyl N-ethyl dithiocarbamate, trihydrate | 250 |
| 20. Sodium N-2-hydroxyethyl N-phenyl dithiocarbamate | 30 |
| 21. Sodium diphenyl dithiocarbamate | 30 |
| 22. Sodium pentamethylene dithiocarbamate | 70 |
| 23. Potassium pentamethylene dithiocarbamate (50 wt. percent aqueous solution) | 150 |
| 24. Zinc pentamethylene dithiocarbamate | 180 |
| 25. Sodium alpha-methyl pentamethylene dithiocarbamate, dihydrate | 130 |
| 26. Zinc alpha-methyl pentamethylene dithiocarbamate | 90 |
| 27. 4-Morpholine carbodithioic acid, sodium salt, dihydrate | 480 |
| 28. 4-Morpholine carbodithioic acid, zinc salt | 70 |
| 29. Disodium ethylene bis-dithiocarbamate, hexahydrate | 470 |
| 30. Disodium N,N'-dimethyl ethylene bis-dithiocarbamate | 80 |
| 31. Zinc N,N'-dimethyl ethylene bis-dithiocarbamate | 220 |
| 32. Disodium 4,4'-methylene dicyclohexyl bis-dithiocarbamate | 520 |
| 33. Disodium 4,4'-diphenylmethane bis-dithiocarbamate | 240 |
| 34. 1,4-Piperazine dicarbodithioic acid, disodium salt | 670 |

EXAMPLE 2

Para-toluidine

Different production lots of para-toluidine were distilled under reduced pressure to obtain water white products for testing. They were tested at 70° C. in open bottles in an air-oven in order to simulate industrial plant storage conditions (para-toluidine is ordinarily stored at temperatures above about 50° C. in order to keep it molten). The unstabilized para-toluidine had a Control Index of 8. The concentration of anti-oxidant in the amine was 0.1%.

| Anti-oxidant | Anti-oxidant Index |
|---|---|
| 1. Sodium mono-ethyl dithiocarbamate | 36 |
| 2. Sodium dimethyl dithiocarbamate, dihydrate | 28 |
| 3. Sodium dimethyl dithiocarbamate, anhydrous | 40 |
| 4. Zinc dimethyl dithiocarbamate | 16 |
| 5. Sodium diethyl dithiocarbamate, trihydrate | 48 |
| 6. Zinc diethyl dithiocarbamate | 28 |
| 7. Sodium di-n-propyl dithiocarbamate, trihydrate | 100 |
| 8. Zinc di-n-propyl dithiocarbamate | 28 |
| 9. Sodium diisopropyl dithiocarbamate, 2½·H₂O | 60 |
| 10. Sodium di-n-butyl dithiocarbamate, hydrate | 20 |
| 11. Potassium di-n-butyl dithiocarbamate | 28 |
| 12. Zinc di-n-butyl dithiocarbamate | 16 |
| 13. Sodium di-sec.-butyl dithiocarbamate, trihydrate | 24 |
| 14. Sodium di-n-amyl dithiocarbamate | 12 |
| 15. Sodium di-n-octyl dithiocarbamate | 20 |
| 16. Sodium diallyl dithiocarbamate | 140 |
| 17. Sodium dimethallyl dithiocarbamate, dihydrate | 20 |
| 18. Sodium cyclohexyl dithiocarbamate, hydrate | 60 |
| 19. Sodium di(hydroxy propyl) dithiocarbamate | 20 (at 80° C.) |
| 20. Sodium N-cyclohexyl N-methyl dithiocarbamate, dihydrate | 4 |
| 21. Sodium N-cyclohexyl N-ethyl dithiocarbamate, dihydrate | 80 |
| 22. Sodium dicyclohexyl dithiocarbamate | 20 |
| 23. Sodium bis-2-hydroxyethyl dithiocarbamate | 52 |
| 24. Zinc bis(2-hydroxyethyl) dithiocarbamate | 20 |
| 25. Sodium N-n-butyl N-2-hydroxyethyl dithiocarbamate, dihydrate | 60 |
| 26. Sodium dibenzyl dithiocarbamate | 60 |
| 27. Sodium di(beta-phenylethyl) dithiocarbamate, dihydrate | 40 |
| 28. Sodium N-phenyl N-methyl dithiocarbamate, dihydrate | 52 |
| 29. Sodium N-phenyl N-ethyl dithiocarbamate, trihydrate | 52 / 112 (at 60° C.) |
| 30. Zinc N-phenyl N-ethyl dithiocarbamate | 36 |
| 31. Sodium N-2-hydroxyethyl N-phenyl dithiocarbamate | 48 |
| 32. Sodium diphenyl dithiocarbamate | 32 |
| 33. Sodium tetramethylene dithiocarbamate, dihydrate | 28 |
| 34. Sodium pentamethylene dithiocarbamate | 12 |
| 35. Potassium pentamethylene dithiocarbamate, (50 wt. percent aqueous solution) | 20 |
| 36. Zinc pentamethylene dithiocarbamate | 16 |
| 37. Sodium alpha-methyl pentamethylene dithiocarbamate, dihydrate | 28 |
| 38. Zinc alpha-methyl pentamethylene dithiocarbamate | 20 |
| 39. Sodium beta-methyl pentamethylene dithiocarbamate, dihydrate | 28 |
| 40. Sodium gamma-methyl pentamethylene dithiocarbamate, trihydrate | 28 |
| 41. 4-Morpholine carbodithioic acid, sodium salt, dihydrate | 64 |
| 42. 4-Morpholine carbodithioic acid, zinc salt | 4 / 68 |
| 43. Disodium ethylene bis-dithiocarbamate, hexahydrate | 40 (0.04% conc.) / 600 (0.09% conc. and room temp.) |
| 44. Disodium N,N'-dimethyl ethylene bis-dithiocarbamate | 44 |
| 45. Disodium 4,4'-methylene dicyclohexyl bis-dithiocarbamate | 80 |
| 46. Disodium 4,4'-methylene diphenyl bis-dithiocarbamate | 84 |
| 47. 1,4-Piperazine dicarbodithioic acid, disodium salt | 36 |
| 48. Ammonium dithiocarbamate | −18 |
| 49. Dimethylammonium dimethyl dithiocarbamate | −4 |
| 50. Diethylammonium diethyl dithiocarbamate | −8 |

Compounds 48, 49 and 50 are included for purposes of comparison and the minus values obtained therewith mean that such compounds accelerated oxidation of the para-toluidine.

EXAMPLE 3

Mixed xylidines

A mixture of isomeric xylidines was obtained by reduction of nitro xylene isomers, produced by nitration of 3° xylene, which mixture contained more than 99.0% total amines calculated as xylidine, about 75% of 4-amino-1,3-dimethyl benzene and less than 5% of 5-amino-1,3-dimethyl benzene, no material insoluble in 10% HCl, less than 0.15% nitro xylene as determined by titanous sulfate reduction, and distilled over the range 214.0° C. (first drop) to 223° C. (95% point) at 760 mm. This mixture was distilled under reduced pressure to obtain a water-white product for the evaluation of anti-oxidants. The following table summarizes the results obtained from stability tests made in clear glass in day-light at atmospheric temperatures. The Control Index of the unstabilized xylidines was 70. The concentration of stabilizer in the amine was 0.1%.

| Anti-oxidant | Anti-oxidant Index |
| --- | --- |
| 1. Sodium dimethyl dithiocarbamate, dihydrate | 400 |
| 2. Zinc dimethyl dithiocarbamate | 200 |
| 3. Sodium diethyl dithiocarbamate, trihydrate | 160 |
| 4. Disodium ethylene bis-dithiocarbamate, hexahydrate | 520 |
| 5. Disodium N,N'-dimethyl ethylene bis-dithiocarbamate | 500 |
| 6. Disodium 4,4'-dicyclohexylmethane bis-dithiocarbamate | 380 |

EXAMPLE 4

*2-chloro-4-amino toluene*

The commercial product crystallized at 21.2° C., had a nitrite absorption value above 96.0%, and contained more than 24.0% chlorine. It was distilled at 10 mm. pressure to obtain a water-white 2-chloro-4-amino toluene for evaluation with the anti-oxidants. The following table summarizes the results obtained from the tests. The Control Index of the unstabilized amine was 90. The concentration of the stabilizer in the amine was 0.1%. The temperature of the tests was at atmospheric temperatures.

| Anti-oxidant | Anti-oxidant Index |
| --- | --- |
| 1. Zinc dimethyl dithiocarbamate | 520 |
| 2. Sodium bis(2-hydroxyethyl) dithiocarbamate | 620 |
| 3. Zinc bis(2-hydroxyethyl) dithiocarbamate | 550 |
| 4. Disodium ethylene bis-dithiocarbamate, hexahydrate | 1200 |
| 5. Zinc ethylene bis-dithiocarbamate | 60 |
| 6. Disodium N,N'-dimethyl ethylene bis-dithiocarbamate | 1230 |
| 7. Disodium 4,4'-methylene dicyclohexyl bis-dithiocarbamate | 1210 |

EXAMPLE 5

*4-chloro-2-amino toluene*

A commercial grade product which contained more than 98% 4-chloro-2-amino toluene was distilled at 20 mm. pressure to remove colored impurities. The following table summarizes the results collected from stability tests made at atmospheric temperatures in day-light exposure. The Control Index of unstabilized 4-chloro-2-amino toluene was 250. The concentration of the anti-oxidant in the amine was 0.1%.

| Anti-oxidant | Anti-oxidant Index |
| --- | --- |
| 1. Sodium dimethyl dithiocarbamate, dihydrate | 270 |
| 2. Sodium diethyl dithiocarbamate, trihydrate | 500 |
| 3. Sodium diisopropyl dithiocarbamate, 2½H₂O | 500 |
| 4. Zinc di-n-butyl dithiocarbamate | 470 |
| 5. Disodium ethylene bis-dithiocarbamate, hexahydrate | 500 |
| 6. Disodium N,N'-dimethyl ethylene bis-dithiocarbamate | 500 |

EXAMPLE 6

*4-amino-diphenyl amines*

A sample of distilled 4-amino-diphenyl amine was taken from a plant distilled product receiver and kept molten until aliquots could be removed for testing the activity of anti-oxidants. Although a blue-violet color had developed during the short period of less than an hour, the results of the evaluation were distinct. The crystallizing point of the initial sample was 69.8° C. The aliquots, after thorough mixing at 80–85° C., were allowed to crystallize and the evaluation was made at atmospheric temperatures. The control (containing no inhibitor) froze to a pale pink solid, but during a 24-hour storage period of exposure to light and air, developed a dark red-lavender color and formed a black tar which wetted the sides of a sample bottle noticeably. In the presence of inhibitors, the suppression of oxidative decomposition to a similar end point is evaluated in terms of anti-oxidant index. The Control Index was 4. The concentration of the stabilizer was 0.1%.

| Anti-oxidant | Anti-oxidant Index |
| --- | --- |
| 1. Sodium diethyl dithiocarbamate, trihydrate | 200 |
| 2. Sodium di-n-propyl dithiocarbamate, trihydrate | 940 |
| 3. Sodium diisopropyl dithiocarbamate, 2½H₂O | 200 |
| 4. Sodium alpha-methyl pentamethylene dithiocarbamate, dihydrate | 200 |
| 5. 4-Morpholine carbodithioic acid sodium salt, dihydrate | 1,760 |
| 6. Disodium ethylene bis-thiocarbamate, hexahydrate | 40 |

EXAMPLE 7

*Diamines*

A sample of toluylene diamine (2,4-diaminotoluene) which had a melting range of 97.4 to 96.3° C. was distilled at 2–3 mm. pressure and 141 to 142° C. vapor temperature to obtain a colorless product for anti-oxidant evaluation. The stabilizer was dissolved in the amine in a concentration of 0.1% at 98° to 100° C., and the samples allowed to solidify in clear glass bottles. The storage tests were conducted at room temperature in diffused day-light. Not only was color used as a criterion of oxidation progress but the appearance of a black tar was considered as the useful limit of anti-oxidant life. The Control Index for the unstabilized amine was 4.

| Anti-oxidant | Anti-oxidant Index |
| --- | --- |
| 1. Sodium diethyl dithiocarbanate, trihydrate | 24 |
| 2. Potassium dibutyl dithiocarbamate | 200 |
| 3. Sodium alpha-methyl pentamethylene dithiocarbamate, dihydrate | 16 |
| 4. 4-Morpholine carbodithioic acid, sodium salt, dihydrate | 24 |
| 5. Disodium ethylene bis-dithiocarbamate, hexahydrate | 24 |

Similar results may be obtained by the addition of my anti-oxidants to other freshly purified phenylene diamines, such as meta-phenylene diamine. For example, freshly distilled commercial meta-phenylene diamine, which crystallized at 62.85° C., was protected from atmospheric oxidation at 70°±2° C. as shown in the following table. The Control Index for the unstabilized metaphenylene diamine was 4. The concentration of the stabilizer in the amine was 0.1%.

| Anti-oxidant | Anti-oxidant Index |
|---|---|
| 1. Sodium dimethyl dithiocarbamate, dihydrate | 28 |
| 2. Zinc dimethyl dithiocarbamate | 16 |
| 3. Sodium diethyl dithiocarbamate, trihydrate | 24 |
| 4. Sodium diisopropyl dithiocarbamate, 2½ H₂O | 16 |
| 5. Sodium di-n-butyl dithiocarbamate, hydrate | 16 |
| 6. Sodium bis(2-hydroxyethyl) dithiocarbamate | 28 |
| 7. Sodium N-phenyl N-methyl dithiocarbamate, dihydrate | 28 |
| 8. Sodium N-phenyl N-ethyl dithiocarbamate, trihydrate | 28 |
| 9. Sodium pentamethylene dithiocarbamate | 28 |
| 10. Sodium alpha-methyl pentamethylene dithiocarbamate, dihydrate | 16 |
| 11. 4-Morpholine carbodithioic acid, sodium salt, dihydrate | 24 |
| 12. Disodium ethylene bis-dithiocarbamate, hexahydrate | 24 |
| 13. Disodium N,N'-dimethyl ethylene bis-dithiocarbamate | 28 |

EXAMPLE 8

N-isobutyl-4-aminophenol

A commercial grade of N-isobutyl-4-aminophenol was distilled under reduced pressure (boiling point at 0.5 mm.=149° C.), and the distillate was collected under nitrogen to prevent oxidation until the anti-oxidants could be dissolved and tested. The tests were carried out in clear glass open topped glass bottles exposed to day-light and at atmospheric temperatures. Progress of oxidation was estimated visually by the progress of color development and appearnace of tar in the solid samples. When a sufficient concentration of oxidation products had accumulated to impart a dark grey-brown color, the isobutyl-4-aminophenol was considered unfit for commercial uses. The initial color of the distillate under nitrogen was a pale amber which, in the absence of an anti-oxidant, developed to a dark grey color in less than 4 days exposure to the atmosphere. The Control Index was 4. Concentration of the anti-oxidant in the amine was 0.1%.

| Anti-oxidant | Anti-oxidant Index |
|---|---|
| 1. Sodium dimethyl dithiocarbamate, dihydrate | 72 |
| 2. Sodium diethyl dithiocarbamate, trihydrate | 104 |

EXAMPLE 9

Alpha-naphthylamine

Several batches of alpha-naphthylamine, which crystallized at 46.0° C. to 46.1° C. (by maximum rise method) and contained 4.6% to 4.4% of beta-isomer, were redistilled at 1–2 mm. pressure to obtain a colorless distillate which froze to a white crystalline solid on cooling. The oxidation decomposition rates were determined in an air-oven at 70° C. in open glass bottles to simulate industrial plant storage conditions. The extent of the decomposition was estimated by visual examination. The Control Index of unstabilized alpha-naphthylamine was 4. The concentration of the anti-oxidant in the amine was 0.2%, unless otherwise indicated.

| Anti-oxidant | Anti-oxidant Index |
|---|---|
| 1. Sodium dimethyl dithiocarbamate, dihydrate | 16 (0.1% conc.). |
| 2. Sodium dimethyl dithiocarbamate | 28, 32. |
| 3. Zinc dimethyl dithiocarbamate | 12. |
| 4. Sodium diethyl dithiocarbamate, trihydrate | {4 (0.05% conc.). 8 (0.1% conc.). 20. |
| 5. Sodium di-n-propyl dithiocarbamate, trihydrate | 36. |
| 6. Zinc di-n-propyl dithiocarbamate | 4. |
| 7. Sodium diisopropyl dithiocarbamate, 2½ H₂O | 24. |
| 8. Zinc diisopropyl dithiocarbamate | 12. |
| 9. Sodium di-n-butyl dithiocarbamate, dihydrate | 24. |
| 10. Potassium di-n-butyl dithiocarbamate | {12. 1464 (room temp.). |
| 11. Zinc di-n-butyl dithiocarbamate | 12 (0.1% conc.). |
| 12. Sodium di-sec.-butyl dithiocarbamate, trihydrate | 20. |
| 13. Sodium di-n-amyl dithiocarbamate | 12. |
| 14. Sodium di-n-octyl dithiocarbamate | 12. |
| 15. Sodium diallyl dithiocarbamate | 4. |
| 16. Zinc diallyl dithiocarbamate | 12. |
| 17. Sodium dimethallyl dithiocarbamate, dihydrate | 12. |
| 18. Sodium cyclohexyl dithiocarbamate, hydrate | 56. |
| 19. Sodium N-cyclohexyl N-methyl dithiocarbamate, dihydrate | 40. |
| 20. Sodium N-cyclohexyl N-ethyl dithiocarbamate, dihydrate | 80. |
| 21. Sodium dicyclohexyl dithiocarbamate | 16. |
| 22. Zinc bis(2-hydroxyethyl) dithiocarbamate | 16. |
| 23. Sodium N-n-butyl N-2-hydroxyethyl dithiocarbamate, dihydrate | 16. |
| 24. Sodium dibenzyl dithiocarbamate | 16. |
| 25. Zinc dibenzyl dithiocarbamate | 4. |
| 26. Sodium di(beta-phenyl ethyl) dithiocarbamate, dihydrate | 20. |
| 27. Sodium N-phenyl N-methyl dithiocarbamate, dihydrate | 20. |
| 28. Sodium N-phenyl N-ethyl dithiocarbamate, trihydrate | 16. |
| 29. Zinc N-phenyl N-ethyl dithiocarbamate | 24. |
| 30. Sodium N-2-hydroxyethyl N-phenyl dithiocarbamate | 4. |
| 31. Sodium diphenyl dithiocarbamate | 12. |
| 32. Sodium tetramethylene dithiocarbamate, dihydrate | 36. |
| 33. Sodium pentamethylene dithiocarbamate | 24. |
| 34. Potassium pentamethylene dithiocarbamate (50 wt. percent aqueous solution) | 16. |
| 35. Zinc pentamethylene dithiocarbamate | 12. |
| 36. Sodium alpha-methyl pentamethylene dithiocarbamate, dihydrate | {32 (0.1% conc.). 44. 552 (room temp.). |
| 37. Zinc alpha-methyl pentamethylene dithiocarbamate | 16. |
| 38. Sodium beta-methyl pentamethylene dithiocarbamate, dihydrate | 36. |
| 39. Sodium gamma-methyl pentamethylene dithiocarbamate, trihydrate | 32. |
| 40. 4-Morpholine carbodithioic acid, sodium salt, dihydrate | 12. |
| 41. 4-Morpholine carbodithioic acid, zinc salt | 4. |
| 42. Disodium ethylene bis-dithiocarbamate, hexahydrate | 8. |
| 43. Disodium N,N'-dimethyl ethylene bis-dithiocarbamate | {20. 12 (0.1% conc.). |
| 44. Zinc N,N'-dimethyl ethylene bis-dithiocarbamate | 4. |
| 45. Disodium 4,4'-methylene dicyclohexyl bis-dithiocarbamate | 8 (0.1% conc.). |
| 46. 1,4-Piperazine dicarbodithioic acid, disodium salt | 4. |
| 47. Ammonium dithiocarbamate | −18. |
| 48. Cyclohexylammonium cyclohexyl dithiocarbamate | −4. |

Compounds 47 and 48 are included for purposes of comparison and the minus values mean that such compounds accelerated oxidation of the alpha-naphthylamine.

EXAMPLE 10

N-phenyl-alpha-naphthylamine

The N-phenyl-alpha-naphthylamine, used in the oxidative tests, had a crystallizing point of 56.1° C. The oxidative decomposition rates were determined in an air oven at 70° C. in open glass bottles to simulate industrial plant storage conditions. The extent of decomposition was estimated by visual examination. The Control Index of unstabilized N-phenyl-alpha-naphthylamine was 8. The concentration of the anti-oxidant was 0.2% in the amine.

| Anti-oxidant | Anti-oxidant Index |
|---|---|
| 1. Sodium dimethyl dithiocarbamate | 28 |
| 2. Sodium di-n-propyl dithiocarbamate, trihydrate | 40 |
| 3. Zinc di-n- propyl dithiocarbamate | 12 |
| 4. Sodium diallyl dithiocarbamate | 12 |
| 5. Sodium bis(2-hydroxyethyl) dithiocarbamate | 12 |
| 6. Sodium N-ethyl N-cyclohexyl dithiocarbamate, dihydrate | 40 |
| 7. Sodium N-ethyl N-phenyl dithiocarbamate, trihydrate | 52 |
| 8. Sodium alpha-methyl pentamethylene dithiocarbamate, dihydrate | 28 |
| 9. 4-Morpholine carbodithioic acid, sodium salt, dihydrate | 20 |
| 10. Disodium ethylene bis-dithiocarbamate, hexahydrate | 12 |
| 11. Disodium N,N'-dimethyl ethylene bis-dithiocarbamate | 20 |

EXAMPLE 11

*Tolidine (3,3'-dimethyl-4,4'-diaminodiphenyl)*

The anti-oxidants were dissolved in aliquots of an inversion mixture of tolidine, isopropyl alcohol, ortho-toluidine, palladium hydrogenation catalyst, and isomeric by-products (obtained from the inversion of crude ortho-hydrazo toluene with hydrochloric acid followed by alkalifying with sodium hydroxide). These aliquots were allowed to stand at room temperature in clear glass bottles exposed to diffused daylight for five days and then heated at 75–80° C. for six days. The tolidine was recovered by filtration, and washed with toluene and water to remove impurities. The effectiveness of anti-oxidants was evaluated on a melting point basis. The stabilized samples were much lighter in color, and the higher melting points confirmed lower concentration of oxidation products.

| Anti-oxidant | Concentration, Percent | M. P., ° C. |
|---|---|---|
| Control | 0 | 125.6 |
| Disodium ethylene bis dithiocarbamate | 0.08 | 126.2 |
| Sodium diethyl dithiocarbamate, trihydrate | 0.05 | 126.0 |

EXAMPLE 12

*Ortho-anisidine*

Colorless samples of ortho-anisidine, which had a crystallizing point above 4° C., were obtained by distillation under reduced pressure (10 mm. of mercury) at 101°–104° C. Inhibitors were added in the indicated concentrations to 50 cc. aliquots which were then stored at room temperature in clear glass, lightly capped bottles exposed to diffused daylight. Color changes were observed periodically. The results, expressed as anti-oxidant index, are summarized in the following table:

| Anti-oxidant | Control Index | Conc., Wt. Percent | Anti-oxidant Index |
|---|---|---|---|
| Sodium dimethyl dithiocarbamate, dihydrate | 30 | 0.14 | 54 |
| Sodium diethyl dithiocarbamate, trihydrate | 52 | 0.1 | 30 |
| Sodium diisopropyl dithiocarbamate, trihydrate | 52 | 0.1 | 24 |
| Zinc di-n-butyl dithiocarbamate | 52 | 0.1 | 24 |
| Sodium N-ethyl N-cyclohexyl dithiocarbamate | 30 | 0.1 | 60 |
| Sodium N-phenyl N-ethyl dithiocarbamate, trihydrate | 30 | 0.1 | 96 |
| Sodium salt, alpha pipecoline carbodithioic acid, dihydrate | 30 | 0.1 | 78 |
| Disodium N,N'-dimethyl ethylene bis-dithiocarbamate | 52 | 0.1 | 30 |
| Disodium 4,4'-methylene dicyclohexyl bis-dithiocarbamate | 52 | 0.1 | 30 |

EXAMPLE 13

*Para-anisidine*

Crude para-anisidine, obtained from the hydrogenation of para-nitro-anisole, was distilled at 3–4 mm. mercury pressure at 103°–104° C. to obtain a pale yellow refined product which crystallized at 56.2° C. Evaluations of oxidation inhibitors were made with 50 cc. aliquots into which the inhibitors were incorporated in the indicated amounts expressed as per cent by weight at 70°–75° C. The samples were then stored at 70°±1° C. in clear glass open mouth bottles and the color changes observed periodically. The control index for the unstabilized amine was 4. The following results were obtained:

| Anti-oxidant | Conc., Wt. Percent | Anti-oxidant Index |
|---|---|---|
| Dimethyl dithiocarbamate, sodium salt, dihydrate | 0.03 | 8 |
|  | 0.14 | 16 |
| Potassium di-n-butyl dithiocarbamate | 0.1 | 32 |
| Sodium N-ethyl N-cyclohexyl dithiocarbamate | 0.1 | 12 |
| Sodium N-ethyl N-phenyl dithiocarbamate, trihydrate | 0.1 | 12 |
| Sodium diallyl dithiocarbamate | 0.14 | 24 |
| Sodium N-butyl N-(2-hydroxy ethyl) dithiocarbamate | 0.14 | 32 |
| alpha-Pipecoline carbodithioic acid, sodium salt, dihydrate | 0.1 | 12 |

EXAMPLE 14

*Cresidine*

Cresidine (2-methoxy 5-methyl aniline) was distilled under reduced pressure (8 mm. mercury pressure) at 113°–114° C. to obtain a nearly colorless product for anti-oxidant evaluation. The dithiocarbamates were added in quantities required to produce the indicated concentrations at 70°–75° C. and stirred until dissolved. The aliquots were stored at 70°±2° C. exposed to the atmosphere in clear glass open mouth bottles. The control index for the unstabilized amine was 8. The following results were obtained:

| Anti-oxidant | Conc., Wt. Percent | Anti-oxidant Index |
|---|---|---|
| Sodium dimethyl dithiocarbamate, dihydrate | 0.14 | 12 |
| Sodium diethyl dithiocarbamate, trihydrate | 0.1 | 8 |
| Zinc di-n-butyl dithiocarbamate | 0.1 | 8 |
| Sodium N-ethyl N-cyclohexyl dithio-carbamate | 0.1 | 12 |
| Sodium N-ethyl N-phenyl dithiocarbamate | 0.1 | 12 |
| Piperidine carbodithioic acid, sodium salt | 0.1 | 20 |
| alpha-Pipecoline carbodithioic acid, sodium salt, dihydrate | 0.14 | 12 |
| Disodium N,N'-dimethyl ethylene bisdithiocarbamate | 0.1 | 20 |

The protective action of the oxidation inhibitors is further illustrated by comparison of crystallizing points of the untreated control, and the stabilized samples after 10 days at 68°–70° C. (concentrations 0.1% by weight):

°C.

Control _____ 50.7
Piperidine carbodithioic acid, sodium salt__ 51.3
Disodium N,N'-dimethyl ethylene bis-dithiocarbamate _____ 51.4

EXAMPLE 15

Ortho-phenetidine

A sample of commercial ortho-phenetidine was redistilled under reduced pressure (10 mm. of mercury) at 104° C. to obtain a colorless product for anti-oxidant evaluations. The anti-oxidants were added in quantities sufficient to produce a 0.1% by weight concentration to 50 cc. aliquots which were then stored at room temperature in clear glass bottles. The control index of the unstabilized amine was 16.

| Anti-oxidant | Anti-oxidant Index |
|---|---|
| Sodium N-ethyl N-cyclohexyl dithio-carbamate | 32 |
| alpha-Pipecoline carbodithioic acid, sodium salt, dihydrate | 16 |

EXAMPLE 16

Para-phenetidine

Samples of commercial para-phenetidine, which contained less than 2% of impurities or amines other than para-phenetidine, were distilled under reduced pressure (15 mm. of mercury) at 125° C. to obtain a nearly colorless product for evaluation of oxidation inhibitors. Inhibitors were incorporated in the indicated amounts to 50 cc. aliquots which were then stored at room temperature, and the color development followed. The results are summarized in tabular form:

| Anti-oxidant | Conc., Wt. Percent | Control Index | Anti-oxidant Index |
|---|---|---|---|
| Sodium dimethyl dithiocarbamate, dihydrate | 0.14 | 20 | 20 |
| Sodium diethyl dithiocarbamate, trihydrate | 0.1 | 30 | 20 |
| Sodium diisopropyl dithiocarbamate, trihydrate | 0.1 | 30 | 20 |
| Sodium di-n-butyl dithiocarbamate | 0.1 | 30 | 12 |
| Potassium di-n-butyl dithiocarbamate | 0.1 | 16 | 20 |
| Zinc-di-n-butyl dithiocarbamate | 0.1 | 30 | 44 |
| Sodium diamyl dithiocarbamate | 0.1 | 30 | 28 |
| Sodium cyclohexyl dithiocarbamate | 0.12 | 20 | 64 |
| Sodium N-methyl N-cyclohexyl dithiocarbamate | 0.12 | 20 | 76 |
| Sodium N-ethyl N-phenyl dithiocarbamate, trihydrate | 0.1 | 30 | 8 |
| Piperidine carbodithioic acid, sodium salt | 0.1 | 30 | 20 |
| 4-Morpholine carbodithioic acid, sodium salt, dihydrate | 0.1 | 30 | 12 |
| Disodium ethylene bis-dithiocarbamate, hexahydrate | 0.1 | 20 | 26 |
| Disodium N,N'-dimethyl ethylene bis-dithiocarbamate | 0.1 | 20 | 20 |
| Disodium 4,4'-methylene dicyclohexyl bis-dithiocarbamate | 0.1 | 20 | 20 |

It will be understood that the preceding examples are given solely for illustrative purposes and that I do not intend to limit my invention to the specific embodiments disclosed therein. It will be apparent to those skilled in the art that other aromatic amines, within the class heretofore disclosed, may be similarly stabilized. It will also be apparent that other dithiocarbamates, within the class hereinbefore defined, and mixtures of any two or more thereof may be substituted for those of the examples. It will be further apparent that the concentration of the anti-oxidant in the aromatic amine may also be varied within the limits disclosed. Still further, the stabilized amine may be diluted with inert liquid solvents.

It will be apparent that, by my invention, I am able to provide a class of aromatic amines which are effectively stabilized against oxidation for relatively long periods of time. Thereby, the amines may be stored without material loss in amine or contamination of the amine with deleterious oxidation products and it is unnecessary to schedule the production of the aromatic amines so that they are consumed as rapidly as they are produced. Also, the losses, entailed in purification of oxidized amine, are eliminated or greatly reduced. Accordingly, it is apparent that my invention constitutes a valuable advance in and contribution to the art.

I claim:

1. A composition consisting essentially of an aromatic amine of the class consisting of alpha-naphthylamine, N-phenyl-alpha-naphthylamine, meta-phenylene diamine, 2,4-diamino-toluene, 2-methoxy-5-methyl aniline, tolidines, N-monoalkyl-4-aminophenols in which the alkyl group contains 1 to 4 carbon atoms, and aromatic amines of the formula R—NH$_2$ wherein R is a monosubstituted phenyl radical in which the substituent group is in one of the positions ortho and para to the NH$_2$ group and is selected from alkyl groups of 1 to 4 carbon atoms, alkoxy groups of 1 to 4 carbon atoms, and a monophenylamino group, and a disubstituted phenyl radical in which one substituent is an alkyl group of 1 to 4 carbon atoms in one of the positions ortho and para to the NH$_2$ group and the other substituent is selected from alkyl groups of 1 to 4 carbon atoms and a chlorine atom, and from about 0.01% to about 0.5% of a dithiocarbamate of the class consisting of sodium, potassium and zinc salts of N-substituted dithiocarbamic acids containing 1 to 2

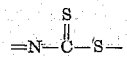

groups and in which the substituent groups are selected from hydrocarbon radicals of 1 to 8 carbon atoms, monohydroxy-substituted acyclic hydrocarbon radicals of 1 to 8 carbon atoms, the —CH$_2$CH$_2$—O—CH$_2$CH$_2$— group, and divalent hydrocarbon radicals of 13 to 16 carbon atoms containing two 6-membered carbocyclic rings joined by a saturated acyclic group and in which the free valences belong to different rings, in which dithiocarbamate there is only one bond directly connecting any nitrogen atom to any carbon atom.

2. A composition consisting essentially of an aromatic amine of the class consisting of alpha-naphthylamine, N-phenyl-alpha-naphthylamine, meta-phenylene diamine, 2,4-diamino-toluene, 2-methoxy-5-methyl aniline, tolidines, N-monoalkyl-4-aminophenols in which the alkyl group contains 1 to 4 carbon atoms, and aromatic amines of the formula R—NH$_2$ wherein R is a monosubstituted phenyl radical in which the substituent group is in one of the positions ortho and para to the NH$_2$ group and is selected from alkyl groups of 1 to 4 carbon atoms, alkoxy groups of 1 to 4 carbon atoms, and a monophenylamino group, and a disubstituted phenyl radical in which one substituent is an alkyl group of 1 to 4 carbon atoms in one of the positions ortho and para to the NH$_2$ group and the other substitutent is selected from alkyl groups of 1 to 4 carbon atoms and a chlorine atom, and from about 0.01% to about 0.5% of a sodium N-substituted dithiocarbamate containing 1 to 2

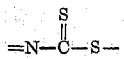

groups in which the substituent groups are restricted to hydrocarbon radicals of from 1 to 8 carbon atoms and in which dithiocarbamate there is only one bond directly connecting any nitrogen atom to any carbon atom.

3. A composition consisting essentially of an aromatic amine of the class consisting of alpha-naphthylamine, N-phenyl-alpha-naphthylamine, meta-phenylene diamine, 2,4-diamino-toluene, 2-methoxy-5-methyl aniline, tolidines, N-monoalkyl-4-aminophenols in which the alkyl group contains 1 to 4 carbon atoms, and aromatic amines of the formula R—NH$_2$ wherein R is a monosubstituted phenyl radical in which the substituent group is in one of the positions ortho and para to the NH$_2$ group and is selected from alkyl groups of 1 to 4 carbon atoms, alkoxy groups of 1 to 4 carbon atoms, and a monophenylamino group, and a disubstituted phenyl radical in which one substituent is an alkyl group of 1 to 4 carbon atoms in one of the positions ortho and para to the NH$_2$ group and the other substituent is selected from alkyl groups of 1 to 4 carbon atoms and a chlorine atom, and from about 0.01% to about 0.5% of a sodium N-substituted dithiocarbamate containing 1 to 2

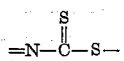

groups in which the substituent groups are restricted to hydrocarbon radicals of from 1 to 6 carbon atoms and in which dithiocarbamate there is only one bond directly connecting any nitrogen atom to any carbon atom.

4. A composition consisting essentially of an aromatic amine of the class consisting of alpha-naphthylamine, N-phenyl-alpha-naphthylamine, meta-phenylene diamine, 2,4-diamino-toluene, 2-methoxy-5-methyl aniline, tolidines, N-monoalkyl-4-aminophenols in which the alkyl group contains 1 to 4 carbon atoms, and aromatic amines of the formula R—NH$_2$ wherein R is a monosubstituted phenyl radical in which the substituent group is in one of the positions ortho and para to the NH$_2$ group and is selected from alkyl groups of 1 to 4 carbon atoms, alkoxy groups of 1 to 4 carbon atoms, and a monophenylamino group, and a disubstituted phenyl radical in which one substituent is an alkyl group of 1 to 4 carbon atoms in one of the positions ortho and para to the NH$_2$ group and the other substituent is selected from alkyl groups of 1 to 4 carbon atoms and a chlorine atom, and from about 0.01% to about 0.5% of a sodium N-substituted dithiocarbamate containing a single

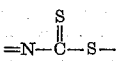

group in which the substituent groups are restricted to hydrocarbon radicals of from 1 to 6 carbon atoms and in which dithiocarbamate there is only one bond directly connecting any nitrogen atom to any carbon atom.

5. A composition consisting essentially of an aromatic amine of the class consisting of alpha-naphthylamine, N-phenyl-alpha-naphthylamine, meta-phenylene diamine, 2,4-diamino-toluene, 2-methoxy-5-methyl aniline, tolidines, N-monoalkyl-4-aminophenols in which the alkyl group contains 1 to 4 carbon atoms, and aromatic amines of the formula R—NH$_2$ wherein R is a monosubstituted phenyl radical in which the substituent group is in one of the positions ortho and para to the NH$_2$ group and is selected from alkyl groups of 1 to 4 carbon atoms, alkoxy groups of 1 to 4 carbon atoms, and a monophenylamino group, and a disubstituted phenyl radical in which one substituent is an alkyl group of 1 to 4 carbon atoms in one of the positions ortho and para to the NH$_2$ group and the other substituent is selected from alkyl groups of 1 to 4 carbon atoms and a chlorine atom, and from about 0.01% to about 0.5% of sodium N-cyclohexyl N-ethyl dithiocarbamate.

6. A composition consisting essentially of an aromatic amine of the class consisting of alpha-naphthylamine, N-phenyl-alpha-naphthylamine, meta-phenylene diamine, 2,4-diamino-toluene, 2-methoxy-5-methyl aniline, tolidines, N-monoalkyl-4-aminophenols in which the alkyl group contains 1 to 4 carbon atoms, and aromatic amines of the formula R—NH$_2$ wherein R is a monosubstituted phenyl radical in which the substituent group is in one of the positions ortho and para to the NH$_2$ group and is selected from alkyl groups of 1 to 4 carbon atoms, alkoxy groups of 1 to 4 carbon atoms, and a monophenylamino group, and a disubstituted phenyl radical in which one substituent is an alkyl group of 1 to 4 carbon atoms in one of the positions ortho and para to the NH$_2$ group and the other substituent is selected from alkyl groups of 1 to 4 carbon atoms and a chlorine atom, and from about 0.01% to about 0.5% of sodium diallyl dithiocarbamate.

7. A composition consisting essentially of an aromatic amine of the formula R—NH$_2$ wherein R is a substituted phenyl radical in which the substituent groups consist of 1 to 2 alkyl groups of 1 to 4 carbon atoms and in which at least one alkyl group is para to the NH$_2$ group, and from about 0.01% to about 0.5% of a dithiocarbamate of the class consisting of sodium, potassium and zinc salts of N-substituted dithiocarbamic acids containing 1 to 2

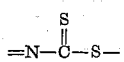

groups and in which the substituent groups are selected from hydrocarbon radicals of 1 to 8 carbon atoms, monohydroxy-substituted acyclic hydrocarbon radicals of 1 to 8 carbon atoms, the —CH$_2$CH$_2$—O—CH$_2$CH$_2$— group, and divalent hydrocarbon radicals of 13 to 16 carbon atoms containing two 6-membered carbocyclic rings joined by a saturated acyclic group and in which the free valences belong to different rings, in which dithiocarbamate there is only one bond directly connecting any nitrogen atom to any carbon atom.

8. A composition consisting essentially of an aromatic amine of the formula R—NH$_2$ wherein R is a substituted phenyl radical in which the substituent groups consist of 1 to 2 alkyl groups of 1 to 4 carbon atoms and in which at least one alkyl group is para to the NH$_2$ group, and from about 0.01% to about 0.5% of a sodium N-substituted dithiocarbamate containing 1 to 2

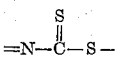

groups in which the substituent groups are restricted to hydrocarbon radicals of 1 to 8 carbon atoms and in which dithiocarbamate there is only one bond directly connecting any nitrogen atom to any carbon atom.

9. A composition consisting essentially of an aromatic amine of the formula R—NH₂ wherein R is a substituted phenyl radical in which the substituent groups consist of 1 to 2 alkyl groups of 1 to 4 carbon atoms and in which at least one alkyl group is para to the NH₂ group, and from about 0.01% to about 0.5% of a sodium N-substituted dithiocarbamate containing a single

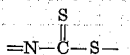

group in which the substituent groups are restricted to hydrocarbon radicals of 1 to 6 carbon atoms and in which dithiocarbamate there is only one bond directly connecting any nitrogen atom to any carbon atom.

10. A composition consisting essentially of an aromatic amine of the formula R—NH₂ wherein R is a substituted phenyl radical in which the substituent groups consist of 1 to 2 alkyl groups of 1 to 4 carbon atoms and in which at least one alkyl group is para to the NH₂ group, and from about 0.01% to about 0.5% of sodium diallyl dithiocarbamate.

11. A composition consisting essentially of para-toluidine and from about 0.01% to about 0.5% of a dithiocarbamate of the class consisting of sodium, potassium and zinc salts of N-substituted dithiocarbamic acids containing 1 to 2

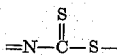

groups and in which the substituent groups are selected from hydrocarbon radicals of 1 to 8 carbon atoms, monohydroxy-substituted acyclic hydrocarbon radicals of 1 to 8 carbon atoms, the —CH₂CH₂—O—CH₂CH₂— group, and divalent hydrocarbon radicals of 13 to 16 carbon atoms containing two 6-membered carbocyclic rings joined by a saturated acyclic group and in which the free valences belong to different rings, in which dithiocarbamate there is only one bond directly connecting any nitrogen atom to any carbon atom.

12. A composition consisting essentially of para-toluidine and from about 0.01% to about 0.5% of a sodium N-substituted dithiocarbamate containing 1 to 2

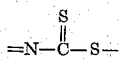

groups in which the substituent groups are restricted to hydrocarbon radicals of from 1 to 8 carbon atoms and in which dithiocarbamate there is only one bond directly connecting any nitrogen atom to any carbon atom.

13. A composition consisting essentially of para-toluidine and from about 0.01% to about 0.5% of a sodium N-substituted dithiocarbamate containing a single

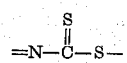

group in which the substituent groups are restricted to hydrocarbon radicals of from 1 to 6 carbon atoms and in which dithiocarbamate there is only one bond directly connecting any nitrogen atom to any carbon atom.

14. A composition consisting essentially of para-toluidine and from about 0.01% to about 0.5% of sodium diallyl dithiocarbamate.

15. A composition consisting essentially of alpha-naphthylamine and from about 0.01% to about 0.5% of a dithiocarbamate of the class consisting of sodium, potassium and zinc salts of N-substituted dithiocarbamic acids containing 1 to 2

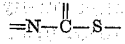

groups and in which the substituent groups are selected from hydrocarbon radicals of 1 to 8 carbon atoms, monohydroxy-substituted acyclic hydrocarbon radicals of 1 to 8 carbon atoms, the —CH₂CH₂—O—CH₂CH₂— group, and divalent hydrocarbon radicals of 13 to 16 carbon atoms containing two 6-membered carbocyclic rings joined by a saturated acyclic group and in which the free valences belong to different rings, in which dithiocarbamate there is only one bond directly connecting any nitrogen atom to any carbon atom.

16. A composition consisting essentially of alpha-naphthylamine and from about 0.01% to about 0.5% of a sodium N-substituted dithiocarbamate containing 1 to 2

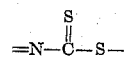

groups in which the substituent groups are restricted to hydrocarbon radicals of from 1 to 8 carbon atoms and in which dithiocarbamate there is only one bond directly connecting any nitrogen atom to any carbon atom.

17. A composition consisting essentially of alpha-naphthylamine and from about 0.01% to about 0.5% of a sodium N-substituted dithiocarbamate containing a single

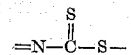

group in which the substituent groups are restricted to hydrocarbon radicals of from 1 to 6 carbon atoms and in which dithiocarbamate there is only one bond directly connecting any nitrogen atom to any carbon atom.

18. A composition consisting essentially of alpha-naphthylamine and from about 0.01% to about 0.5% of sodium N-cyclohexyl N-ethyl dithiocarbamate.

19. A composition consisting essentially of an aromatic amine of the class consisting of alpha-naphthylamine, N-phenyl-alpha-naphthylamine, meta-phenylene diamine, 2,4-diamino-toluene, 2-methoxy-5-methyl aniline, tolidines, N-monoalkyl-4-aminophenols in which the alkyl group contains 1 to 4 carbon atoms, and aromatic amines of the formula R—NH₂ wherein R is a monosubstituted phenyl radical in which the substituent group is in one of the positions ortho and para to the NH₂ group and is selected from alkyl groups of 1 to 4 carbon atoms, alkoxy groups of 1 to 4 carbon atoms, and a monophenylamino group, and a disubstituted phenyl radical in which one substituent is an alkyl group of 1 to 4 carbon atoms in one of the positions ortho and para to the NH₂ group and the other substituent is selected from alkyl groups of 1 to 4 carbon atoms and a chlorine atom, and from about 0.01% to about 0.5% of sodium cyclohexyl dithiocarbamate.

20. A composition consisting essentially of an aromatic amine of the class consisting of alpha-naphthylamine, N-phenyl-alpha-naphthylamine, meta-phenylene diamine, 2,4-diamino-toluene, 2-methoxy-5-methyl aniline, tolidines, N-monoalkyl-4-aminophenols in which the alkyl group contains 1 to 4 carbon atoms, and aromatic amines of the formula R—NH₂ wherein R is a monosubstituted phenyl radical in which the substituent group is in one of the positions ortho and para to the NH₂ group and is selected from alkyl groups of 1 to 4 carbon atoms, alkoxy groups of 1 to 4 carbon atoms, and a monophenylamino group, and a disubstituted phenyl radical in which one substituent is an alkyl group of 1 to 4 carbon atoms in one of the positions ortho and para to the NH₂ group and the other substituent is selected from alkyl groups of 1 to 4 carbon atoms and a chlorine atom, and from about 0.01% to about 0.5% of sodium alpha-methyl pentamethylene dithiocarbamate.

References Cited in the file of this patent

UNITED STATES PATENTS

| Number | Name | Date |
|---|---|---|
| 2,046,884 | Semon | July 7, 1936 |
| 2,302,749 | Dean | Nov. 24, 1942 |
| 2,434,651 | Robertson | Jan. 20, 1948 |
| 2,492,314 | Olin et al. | Dec. 27, 1949 |
| 2,563,007 | Crouch | Aug. 7, 1951 |